United States Patent [19]
Klopfenstein

[11] Patent Number: 4,903,857
[45] Date of Patent: Feb. 27, 1990

[54] LEANING VEHICLE WITH CENTRIFUGAL FORCE COMPENSATION

[76] Inventor: King L. Klopfenstein, 10 Drake Ter., Prospect Heights, Ill. 60070

[21] Appl. No.: 259,333

[22] Filed: Oct. 18, 1988

[51] Int. Cl.$^4$ ............................. B62D 9/02; B62K 5/08
[52] U.S. Cl. .................... 280/267; 280/112.2; 280/269; 280/772
[58] Field of Search ............... 280/267, 263, 266, 268, 280/269, 282, 112.2, 772; 180/210, 211, 219, 253

[56] References Cited

U.S. PATENT DOCUMENTS

| | | | |
|---|---|---|---|
| 3,237,961 | 3/1966 | McMullen | 280/772 |
| 3,447,623 | 6/1969 | Hott | 280/269 X |
| 3,645,558 | 2/1972 | McMullen | 280/270 |
| 3,746,118 | 7/1973 | Altorfer | 280/112.2 X |
| 4,020,914 | 5/1977 | Trautwein | 280/112.2 X |
| 4,072,325 | 2/1978 | Bright et al. | 280/772 |
| 4,088,199 | 5/1978 | Trautwein | 180/209 |
| 4,351,410 | 9/1982 | Townsend | 280/267 |
| 4,360,224 | 11/1982 | Sato et al. | 280/772 |
| 4,469,344 | 9/1984 | Coil | 280/269 |
| 4,624,469 | 11/1986 | Bourne, Jr. | 280/112.2 |
| 4,632,413 | 12/1986 | Fujita et al. | 280/112.2 |
| 4,634,137 | 1/1987 | Cocksedge | 280/269 X |
| 4,650,213 | 3/1987 | Fujita et al. | 280/772 |
| 4,660,853 | 4/1987 | Jephcott | 280/772 |
| 4,740,004 | 4/1988 | McMullen | 280/269 |

FOREIGN PATENT DOCUMENTS

| | | | |
|---|---|---|---|
| 981717 | 1/1976 | Canada | 280/263 |
| 6025 | 1/1986 | Japan | 180/253 |

Primary Examiner—Mitchell J. Hill
Attorney, Agent, or Firm—Emrich & Dithmar

[57] ABSTRACT

A three wheeled vehicle, with two steerable front wheels and a driven rear wheel which may be either rider- or motor-powdered, includes steering/coupling linkage disposed adjacent to the lower end of a steering column having a handlebar attached to its upper end. The steering/coupling linkage pivotally couples a forward frame to a rear frame which supports the rider and includes the rear wheel and its means for propulsion. The steering/coupling linakge includes a pivot shaft, a bearing housing and a mechanical connection for leaning the rear frame in the direction of a turn so as to compensate for centrifugal force encountered in turning the vehicle. The mechanical connection causes the rear frame to lean in a controlled relationship to the amount of rotation of the steering shaft, within rotational limits, to emulate the leaning action of a conventional bicycle when making a turn.

28 Claims, 5 Drawing Sheets

LEANING VEHICLE WITH CENTRIFUGAL FORCE COMPENSATION

BACKGROUND OF THE INVENTION

This invention relates to both rider energized and motor driven three wheeled vehicles with two steerable wheels in front and one powered rear wheel.

Three wheeled vehicles generally include one steerable front wheel and two powered rear wheels. This three wheeled vehicle design is based on providing stability by three point support for the rider. A two wheeled vehicle utilizes steering as the means to balance the vehicle and provide stability with vehicle and rider leaning against the centrifugal force encountered during a turn. The three wheeled vehicle is highly stable when not moving or moving in substantially a straight line. However, this very stability, with the three support points for existing three wheel vehicles, does not allow for leaning of either the vehicle or rider into a turn as in the case of two wheeled vehicles. The result is that existing three wheeled vehicles are very unstable during turns and frequently roll over or throw the rider outward as a result of the centrifugal force exerted upon the rider and vehicle. In some cases, the rider has been thrown off a three wheeled vehicle during a turn with the vehicle remaining upright resulting in the discarded rider being run over by one of the rear drive wheels.

In order to improve stability, a second rear wheel is sometimes incorporated in converting a two wheeled vehicle to one having three wheels. This arrangement requires a modified drive transmission arrangement, frequently including a differential transmission, as well as an intermediate shaft with an additional chain and sprockets to accommodate a three speed shift transmission. This substantially increases the cost and complexity of the vehicle. A more commercially attractive approach would be to add a second front wheel and retain the single rear drive wheel and thus allow the drive means to be identical to the standard, more efficient bicycle stock drive, with either the ten or five speed derailer transmission to drive the single rear wheel as in the case of a conventional two wheeled vehicle.

The present invention overcomes the aforementioned problems of the prior art by counteracting the centrifugal force exerted upon a vehicle and its rider during a turn. In the present invention the seat moving inward in relation to the amount of turn shifts the center of gravity of the rider inward from a line between where the rear wheel and the outer front wheel contact the road so that the rider's weight has a greater anti-rotational force about the aforementioned line to permit a greater centrifugal force on the rider without the vehicle tipping over or the rider falling outward. Also, in the present invention centrifugal force acting on the rider moves him outward, causing the rear frame to rotate and the front wheels to swing back so as to lessen the sharpness of the turn and prevent the vehicle from rolling over. The present invention may be used in combination with the rear portion of a conventional bicycle having a five-or ten-speed transmission with available derailer and caliper brakes. The present invention may also be employed with the oppositely reciprocating pedal drive system of U.S. Pat. No. 4,561,668, issued to the present inventor, or a motor may be used to drive one or more of the three wheels, or any other means may be used to power the vehicle such as wind against an attached sail.

OBJECTS AND SUMMARY OF THE INVENTION

Accordingly, it is an object of the present invention to provide a more stable, safer three wheeled vehicle.

It is another object of the present invention to compensate for the centrifugal force exerted upon the rider of a three wheeled vehicle during a turn by causing the vehicle's frame to automatically lean into a turn in response to turning of the vehicle's handlebars.

A further object of the present invention is to provide a turning capability in a three wheeled vehicle by a lateral shifting of the rider's weight without the direct engagement and movement of a steering mechanism by the rider.

Yet another object of the present invention is to provide a coupling, with a rotational control mechanism, between front and rear frames of a three wheeled vehicle which substantially reduces the effect of making a turn at a velocity where the centrifugal force tends to tip the vehicle and rider outward during the turn.

It is still another object of the present invention to provide the advantages of a three wheeled vehicle having two opposed wheels in the front, instead of the conventional position in the rear of the vehicle, to permit the use of many standard bicycle components (for pedal driven vehicles) or standard motorcycle components (for motor driven vehicles).

A further object of the present invention is to provide suitable steering linkage for the two front wheels of a three wheeled vehicle to ensure that both front wheels turn the required angle so that each wheel follows a curvilinear track of proportional radius.

These and other objects are accomplished in the present invention which contemplates a steering arrangement for a three wheeled vehicle, either powered by the rider or by a motor, wherein two steerable front wheels are coupled by suitable linkage to a central steering column having a handlebar. The handlebar, in turn, is connected to a pivotable rear frame which rotates about a pivot axis as a function of the amount of rotation of the handlebar. Rotation of the rear frame is about an axis passing substantially through the point of contact between the rear wheel and the road. Rotation of the rear frame allows the rider and related vehicle components to lean into a turn to counteract the centrifugal force produced by changing the direction of movement of the vehicle and rider. The present invention incorporates a short swivel link having two spherical rod end bearings at substantially right angles to each other for coupling the steering shaft to the pivoting rear frame. The two spherical rod end bearings have their pivot axes at substantially ninety degrees relative to each other. Other coupling arrangements could be used in place of the swivel link, such as bevel gear sectors, or some other substantially equivalent mechanical transmission.

The present invention contemplates a three wheeled vehicle having two front wheels mounted such that each wheel's pivot shaft is located forward of the wheel's rearward tilted turning axis to produce a "caster" action so that the forces from the vehicle frame and the rider's weight seek to maintain the vehicle moving in a straight, forward direction. This same "caster" action geometry which is designed into the front wheel turning geometry of two wheeled vehicles permits steering of the vehicle by the lateral shifting of the rider's weight. This action further causes the rear frame to lean or tilt and, by suitable connecting linkage to the turning mechanism on the front frame, causes the wheels to turn. The present invention thus provides means to steer the three wheeled vehicle by the rider shifting his weight similar to the manner in which a two wheeled bike may be steered without touching the handlebar.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF PREFERRED EMBODIMENT

Figure 1:
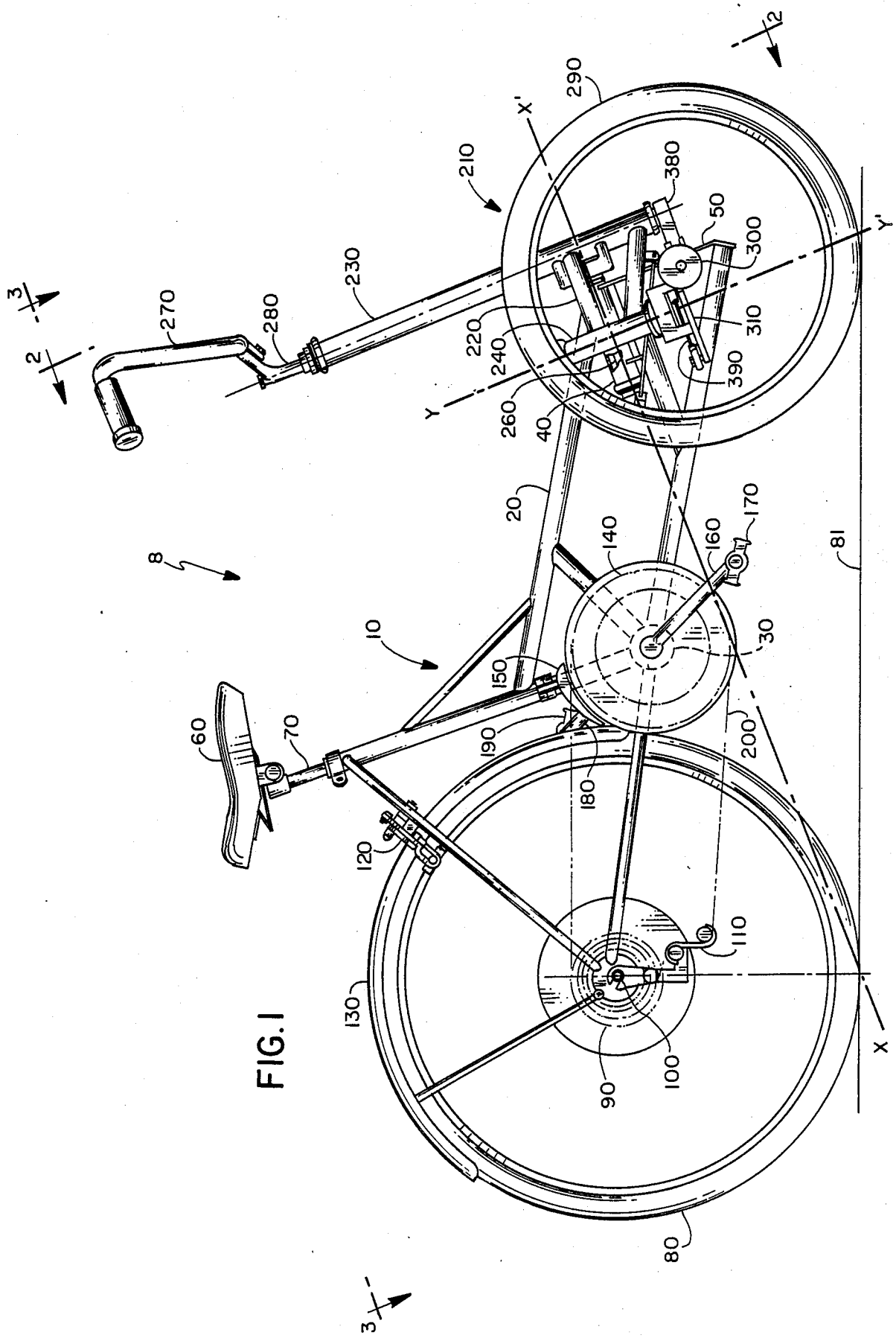
FIG. 1 is a side elevational view of a three wheeled vehicle incorporating the linkage and bearing system to cause the rear frame assembly, including the seat, the rear wheel and its drive means, to lean inward in relation to the amount of turn of the two front (right and left) wheels in accordance with an embodiment of the present invention.
Figure 2:
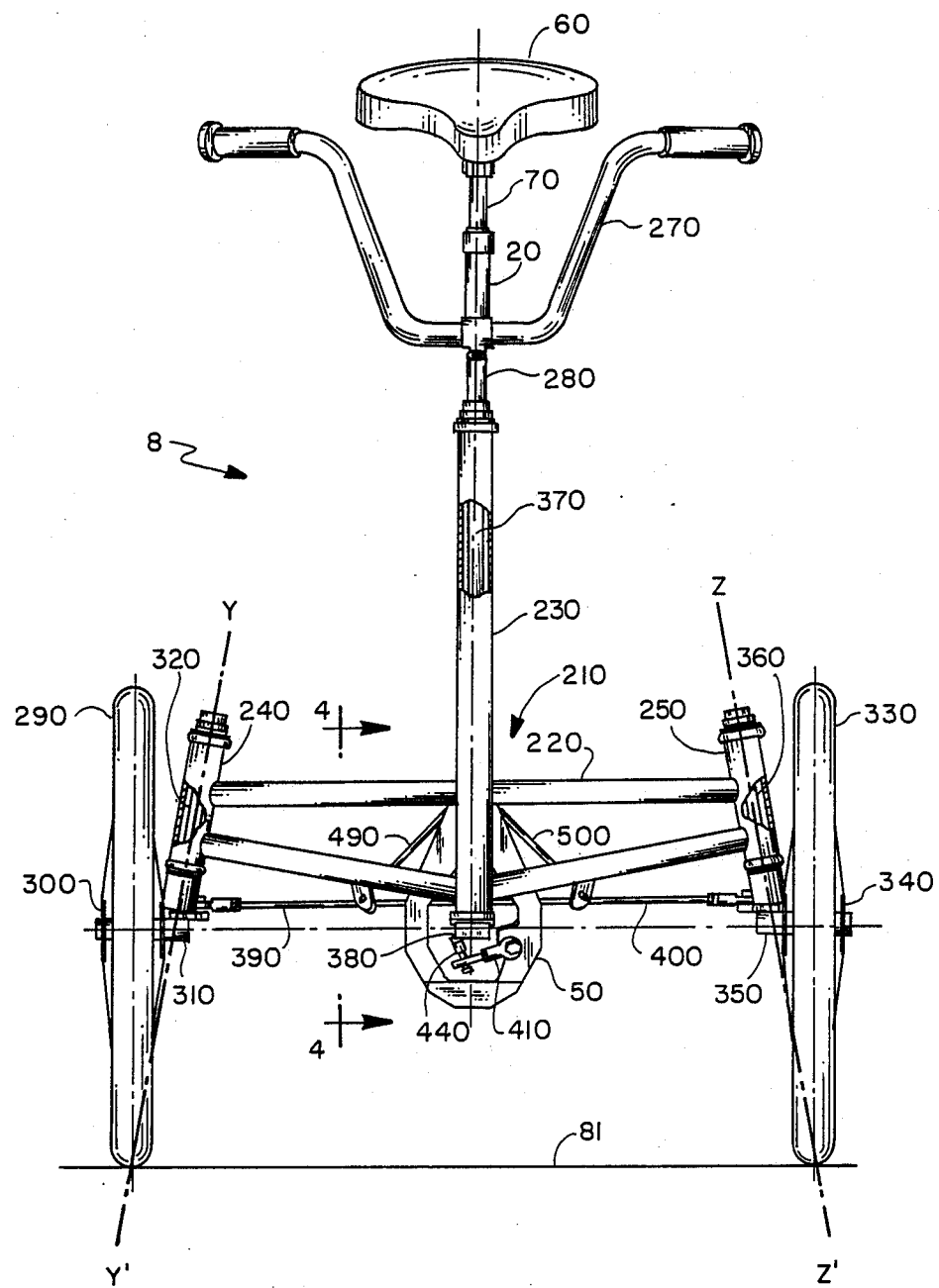
FIG. 2 is a front view of the vehicle shown in FIG. 1 at an angle in line with the pivot axis of the rear frame leaning system and parallel to the steering shaft bearing housing taken along sight line 2—2 in FIG. 1.
Figure 3:
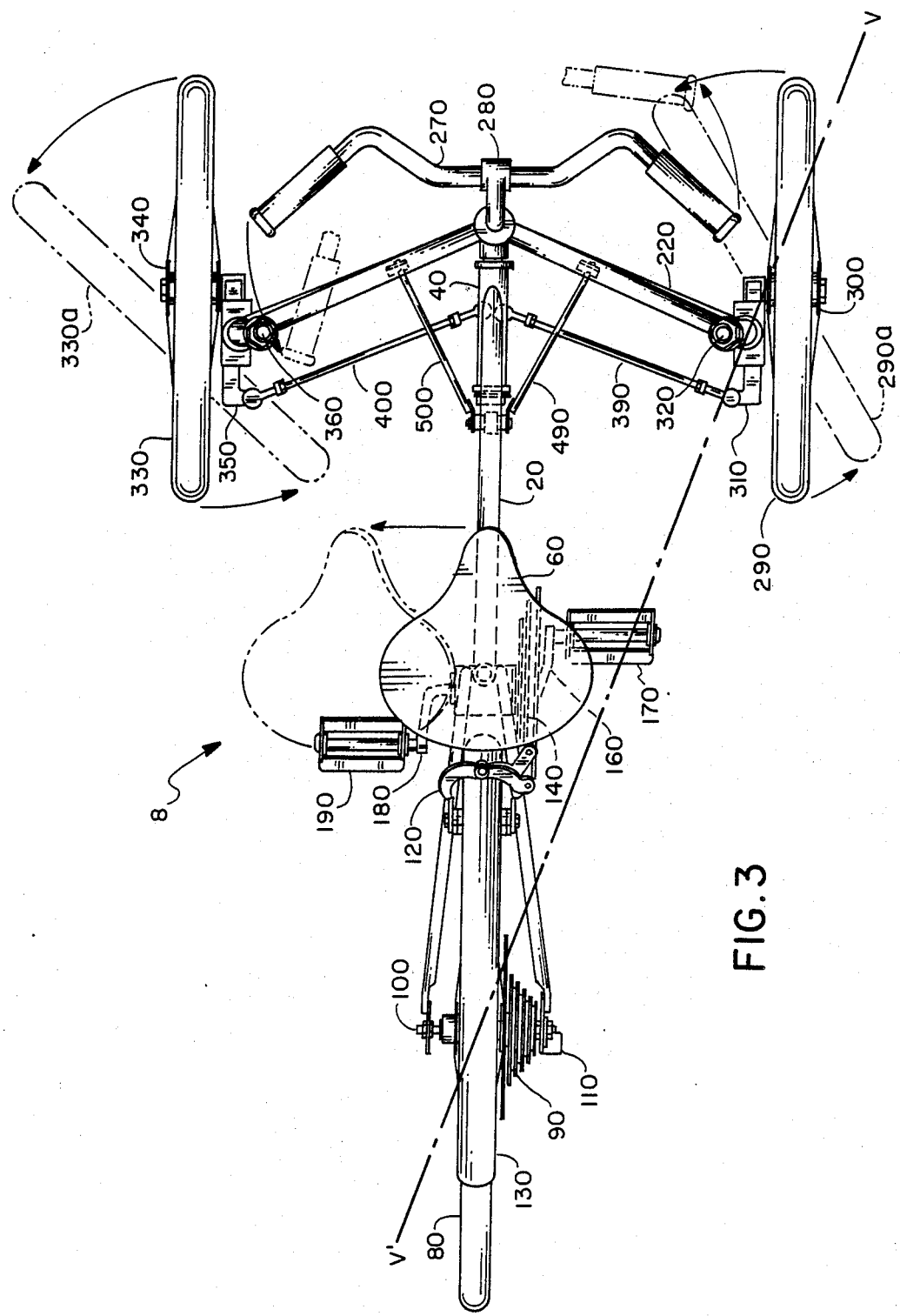
FIG. 3 is an oblique plan view of FIG. 1 taken along sight line 3—3 therein and at an angle parallel to the pivot axis of the rear frame leaning system and at right angles to the steering shaft bearing housing illustrating the seat displaced sideways in relation to the rotation of the handlebar and the front (right and left) wheels.

Referring to FIGS. 1 through 3, there are shown various views of a three wheeled vehicle 8 which leans with the rider to oppose centrifugal force in accordance with the present invention. While the vehicle 8 which leans the rider into a turn is shown using a conventional ten speed drive to power the rear wheel, with the parts being the same as those used to power a ten speed bicycle, the present invention is not limited to this type of drive arrangement but may be employed with virtually any pedal operated means, or a motor, or the wind acting on a sail. The present invention is thus independent of the type of vehicular drive system employed.

The vehicle 8 includes a rear frame assembly 10 and a front frame assembly 210.

The rear frame assembly 10 includes: a rear frame 20 which is integral with a pedal arm bearing housing 30; a rear frame pivot bearing housing 40; and a swivel link connector plate 50. Attached to the rear frame 20 is a seat 60 with its support stem 70, a rear wheel 80, a five driven sprocket cluster 90, a rear wheel axle 100, a driven sprocket derailer 110, a caliper brake 120, a fender 130, a two drive sprocket cluster 140, a drive sprocket derailer 150, a right pedal arm 160, a right pedal 170, a left pedal arm 180, a left pedal 190, and a chain 200 which is the drive connection between the two sprocket clusters 90 and 140.

The front frame assembly 210 includes a front frame 220 which is integral with a steering shaft bearing housing 230, a right wheel turning bearing housing 240, a left wheel turning bearing housing 250, and a rear frame pivot shaft 260. Attached to the front frame 220 is a handlebar 270 with its support arm 280, a right wheel 290 including its bearing hub 300, a right wheel support arm 310 with turning shaft 320, a left wheel 330 including its bearing hub 340, and a left wheel support arm 350 with turning shaft 360.

The rear frame pivot bearing housing 40 with its mating rear frame pivot shaft 260 are positioned so that the axis of the pivot projects rearward and downward to the area where the rear wheel 80 engages the road, or support surface, 81 so that there is no side sway as the rear frame assembly 10 leans laterally as the right and left wheels 290 and 330 are turned, as described below. This axis is designated by the line X—X' in FIG. 1.

The right and left wheels 290 and 330 have their turning bearing housings 240 and 250 with their mating turning shafts 320 and 360 positioned so that their pivot axes project downward, and forward, at approximately 20 degrees and outward, at approximately 10 degrees. The pivot axes for the right and left wheels 290 and 330 are respectively shown as lines Y—Y' and Z—Z' in FIGS. 1 and 2. This permits both pivot axes to pass: (1) approximately 2 inches behind the pivot centers of the wheels 290 and 330; (2) approximately 1½ inches forward of the point of contact of the front wheels with the road 81; and (3) through the approximate center of where the wheels touch the road when viewed from the front, as shown in FIG. 2. This geometry provides a "caster" action for both the right and left wheels 290 and 330 so that the wheels, due to the downward force from the weight of the vehicle and its rider, seek to guide the vehicle forward in a straight line. This geometry also results in minimal disturbance upon either of the wheels hitting a bump because this action against the established linkage geometry produces essentially no torque upon the turning axis of either of these wheels.

The axes of the right and left turning bearing housings 240 and 250 are aligned in a plane substantially parallel to and approximately 5 inches behind the longitudinal axis of the steering shaft bearing housing 230. This geometry allows the vehicle 8 to have a shorter distance between the rear wheel 80 and the right and left wheels 290, 330 which, in turn, permits a shorter turning radius as well as a more compact vehicle while still affording the necessary toe room for the rider's feet positioned upon and displacing the pedals 170 and 140. The geometry of the turning linkage, which includes the right and left wheel support arms 310 and 350, the steering arm 380, and the right and left connecting links 390 and 400, provides the means for the right and left wheels 290 and 330 to turn at different angles during a turn by the vehicle 8. The differential turning angles of the right and left wheels 290, 330 permits these wheels to follow substantially the appropriate different radius path for a given amount of vehicle turning so as to provide a smooth turn without sideways slipping.

The handlebar support arm 280 is coupled to a steering shaft 370 which, in turn, is coupled at its lower end to a steering arm 380. A right connecting link 390 provides the steering connection via a coupling bracket 381 (shown in FIGS. 4 and 5) between the steering arm 380 and the right wheel support arm 310, while a left connecting link 400 also connected to the coupling bracket 381 provides the steering connection between the steering arm 380 and the left wheel support arm 350.

Figure 4:
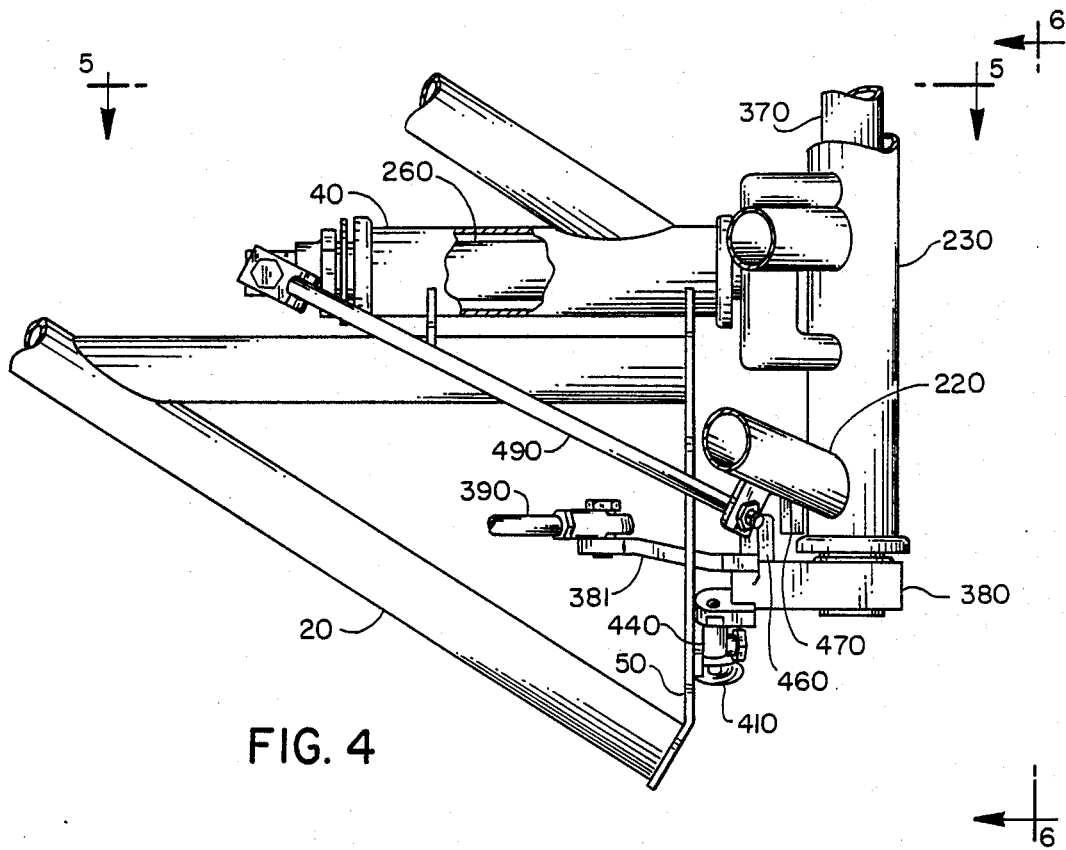
FIG. 4 is an enlarged partially cutaway side elevational view of FIG. 2 taken along sight line 4—4 therein showing additional details of a pivot and linkage system for leaning the rear frame in accordance with the present invention.
Figure 5:
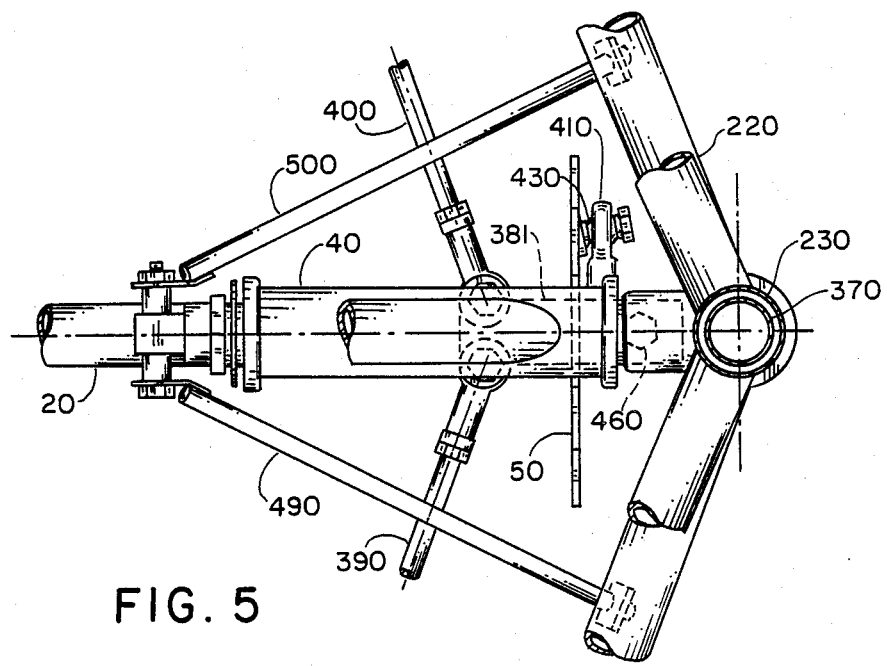
FIG. 5 is a front view of the pivot and linkage system for leaning the rear frame illustrated in FIG. 4 taken along sight line 5—5 therein.
Figure 6:
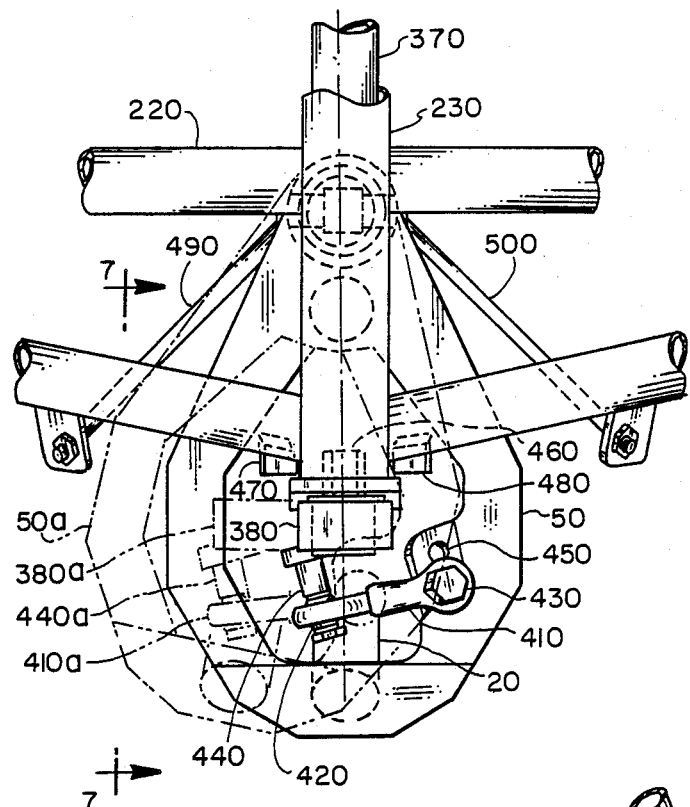
FIG. 6 is a plan view of the pivot and linkage system for leaning the rear frame illustrated in FIG. 4 taken along sight line 6—6 therein.

Referring to FIGS. 4 through 6, there are shown various enlarged views illustrating additional details of a pivoting connection between the rear frame assembly 10 and the front frame assembly 210 in accordance with the present invention. The pivoting connection between these two assemblies permits the rear frame assembly 10 to lean into a turn in relation to the extent the handlebar 270 is turned, as well as providing a limit to the magnitude of the turn. While the present invention is disclosed in terms of linkage as the means to control the relative motion between these two frame assemblies, it is not limited to the described arrangements as other means, such as bevel gear sectors, could be substituted as an alternate mechanical coupling arrangement to provide the described wheel control in accordance with the present invention.

Between the swivel link connector plate 50 of the rear frame 20 and the steering arm 380 of the steering shaft 370 is suitably mounted a swivel link 410 by means of a pair of spherical bearings 420 and 430. A spacer 440 is clamped between the spherical bearing 420 and the steering arm 380 to provide proper geometry for the related motion between the rear and front frames 20 and 220 when the spherical bearing 430 is located as depicted in FIG. 6. To change the extent of leaning of the rear frame 20 as a function of rotational displacement of the steering shaft 370, one or more apertures such as shown for aperture 450, may be provided at various, selected locations in the swivel link connector plate 50. These various aperture locations within the swivel link connector plate 50 would be accommodated by removing and replacement of the spacer 440 by a spacer of different length. A stop post 460 shown in FIGS. 4 and 6 is attached to an upper portion of the steering arm 380. A right stop 470 and a left stop 480 are shown in FIG. 6 attached to the front frame 220 for the purpose of limiting the angular rotation of the steering arm 380 by their engagement of stop post 460. This in, turn, limits the amount of turn that may be imparted to the right and left wheels 290 and 330 as shown for a left maximum turn in FIG. 3 by the position of the front wheels 290a and 330a, shown in dotted line form. Also, as shown in FIG. 3, for the same amount of wheel turn, there is indicated the lateral displacement of the seat 60 in dotted line form, while the rotational displacement of handlebar 270 is shown fragmented in this figure. In FIG. 6, for the same amount of wheel tun as depicted in FIG. 3, there is shown the rotation of the steering arm 380 to position 380a which moves the swivel link 410 with the spacer 440 to positions 410a and 440a causing rotation of the swivel link connector plate 50 of the rear frame 10 to position 50a. The motion depicted to move the seat 60 inward in relation to the amount of turning of the front wheels shifts the center of gravity of the rider inward an increased lateral distance from the line designated V—V' in FIG. 3. This is the axis of rotation for the vehicle and rider to move outward from a centrifugal force generated by making a turn. This occurs whenever the lateral centrifugal force moment about this axis is greater than the vertical force moment generated by the combined weight of the rider and the vehicle about the same axis. A right brace 490 and a left brace 500 provide diagonal ties between the rearward end of the rear frame pivot shaft 260 and the front frame 220 for added strength to the pivot connection.

The bearings with their races between the disclosed shafts and housings are not shown but are standard bicycle parts which are readily available. Also, the manual control levers with their operating cables for operating the derailers and brake are not shown and they too are standard bicycle parts which are readily available.

Figure 7:
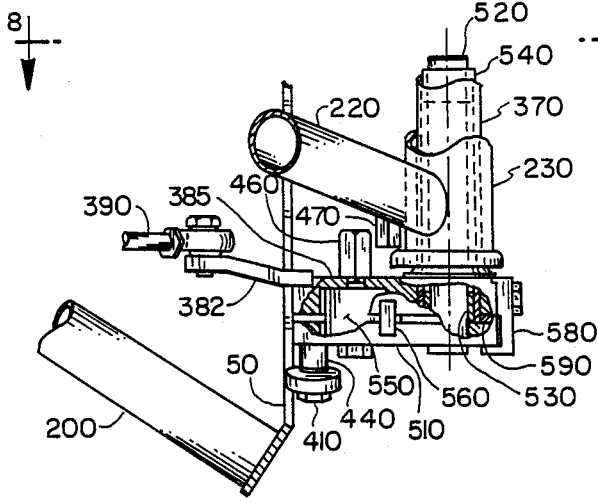
FIG. 7 is as partial sectional view taken along sight line 7—7 in FIG. 6 of an alternate design of a pivot and linkage system for providing a resilient connection between the steering arm and the leaning portion of the linkage system.
Figure 8:
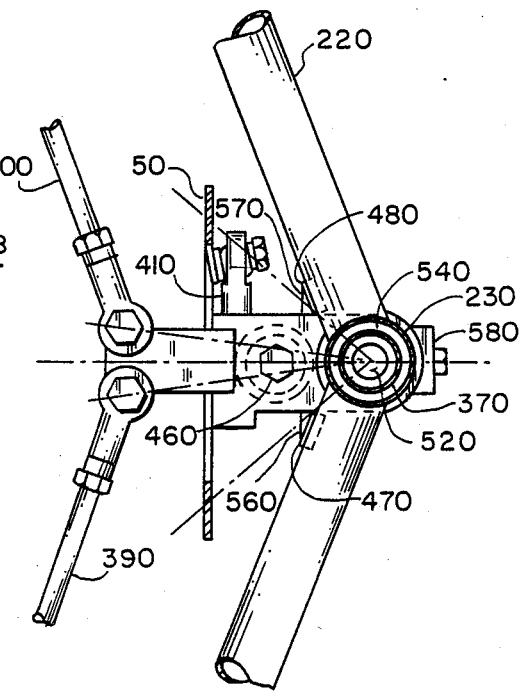
FIG. 8 is a plan view of the alternate design shown in FIG. 7 and taken along sight line 8—8 therein.

Referring to FIGS. 7 and 8, there are respectively shown top and side plan views of an alternate design of the previously described steering arm. In this design, the steering arm 385 with its coupling bracket 382 is coupled to the connecting links 390 and 400 and its motion is limited by engagement of the stop post 460 with either of the stops 470 or 480 in the same manner as for the steering arm 380. A lean motion control arm 510 with its pivot shaft 520 has its pivot bearings 530 and 540 centered in the steering shaft 370 and has a yieldable connection between the arms 385 and 510 by means of an elastomer spacer with its end studs 550. There is also a right stop 560 and a left stop 570 on the steering arm 385 to limit rotational displacement between the two arms 385 and 510. An arm retainer 580 holds the lean control arm 510 up against a thrust bearing 590. A spherical bearing 420 of the swivel link 410 is attached to the lean control arm 510 and through the elastic connection between the two arms provides means for additional rear frame assembly leaning when, during high speeds into a turn, more leaning is desired to overcome the increased centrifugal force.

There has thus been shown a three wheeled vehicle which leans with the rider to oppose centrifugal force when the vehicle is making a turn. The vehicle may be propelled by a conventional drive arrangement such as a ten speed drive system with conventional derailers and may include a standard caliper brake to respectively impart motion and to stop the drive wheel.

In a preferred embodiment, the present invention makes use of two smaller wheels, mounted on wheelchair hubs, as the front wheels to greatly reduce the size of the vehicle without reducing performance. The use of wheelchair hubs eliminates the need for a conventional fork over the wheel. This also permits the turning pivot bearings and their housings to be positioned between the wheels instead of above the wheels and allows for reduced size of the frame both in width and height. This reduction in frame width permits maximum displacement between the wheels in providing for vehicle passage through a doorway of a given width. The reduction in frame height facilitates rider mounting and demounting by lowering that portion of the frame which must be stepped over by a rider.

While particular embodiments of the present invention have been shown and described, it will be obvious to those skilled in the art that changes and modifications may be made without departing from the invention in its broader aspects. For example, a five speed, a three speed, or a single speed drive may be substituted for the disclosed ten speed drive, or a motor may be substituted for a driver powered transmission for propelling the rear wheel. Also, other means may be substituted for the swivel link, such as bevel gears sectors, to provide the mechanical connection between the right and left wheel turning means and the leaning of the rear frame assembly. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A vehicle comprising:
    a forward frame having two forward wheels;
    steering means attached to said forward frame and coupled to said two wheels;
    an aft frame having a single rear wheel; and
    control means coupling said aft frame to said steering means and to said forward frame for pivotally displacing in a leaning manner said aft frame into a turn in response to turning of said steering means and the execution of a turn by the vehicle and for maintaining said forward frame and the two wheels coupled thereto as well as said steering means upright.

2. The vehicle of claim 1 wherein said steering means includes a handlebar and a steering shaft and wherein said control means is coupled to said steering shaft.

3. The vehicle of claim 2 wherein said control means includes a steering arm coupled to a lower end of said steering shaft.

4. The vehicle of claim 3 wherein said control means further includes in combination a connector plate and a pivot shaft coupled to said steering arm and responsive to displacement of said steering arm by said steering shaft for pivotally displacing said aft frame about a longitudinal axis of the vehicle.

5. The vehicle of claim 4 wherein said forward frame includes a hollow, cylindrical housing within which is disposed said pivot shaft and wherein said aft frame is pivotally displaced about a common longitudinal axis of said pivot shaft and said cylindrical housing.

6. The vehicle of claim 5 wherein the longitudinal axis of said pivot shaft and said cylindrical housing is aligned with and intersects a point of contact between said single rear wheel and a support surface upon which the vehicle is positioned.

7. The vehicle of claim 3 wherein said forward frame includes right and left connecting links each coupled to a respective one of said forward wheels and further coupled to said steering arm for coordinating the turning of said forward wheels and preventing sideways slipping of said forward wheels during a turn.

8. The vehicle of claim 7 further comprising in combination a right wheel support arm and a right turning shaft coupled to one of said forward wheels and to said right connecting link and a left wheel support arm and a left turning shaft coupled to the other forward wheel and to said left connecting link.

9. The vehicle of claim 8 wherein one of the forward wheels turns about said right turning shaft and the other forward wheel turns about said left turning shaft.

10. The vehicle of claim 9 wherein respective longitudinal axes of each of said right and left turning shafts are aligned with respective points of contact of one of said forward wheels and a support surface upon which the vehicle is positioned.

11. The vehicle of claim 1 further comprising a seat mounted to said aft frame.

12. The vehicle of claim 1 further comprising drive means mounted to said aft frame.

13. The vehicle of claim 11 wherein said drive means includes a chain and sprocket combination.

14. The vehicle of claim 1 further comprising a handlebar mounted to an upper portion of said steering means.

15. The vehicle of claim 1 further comprising means for limiting turning of said front wheels and leaning of said aft frame.

16. The vehicle of claim 15 wherein said means for limiting vehicle turning and leaning includes right and left stops mounted to said forward frame.

17. The vehicle of claim 1 wherein said control means includes adjustable displacement means for selecting the pivoting displacement of said aft frame for a given turning of said steering means.

18. A three wheeled vehicle comprising:
    a rear frame assembly including a rear frame, a seat, a rear wheel, and vehicle propulsion means for moving the vehicle;
    a front frame assembly including a front frame, a pivotable right wheel, a pivotable left wheel, vehicle steering means for turning the vehicle in a right and left direction and linkage connections coupling said steering means to said right and left wheels for controlling the extent of turning of said right and left wheels in relation to the extent of turning of said steering means; and
    a mechanical control connection means coupling said steering means to said rear frame for causing said rear frame to lean toward the direction of a turn when said steering means is displaced in either direction to turn the vehicle and for maintaining said steering means, said front frame and said right and left wheels upright.

19. A three wheeled vehicle in accordance with claim 18 wherein said vehicle propulsion means includes:
    two opposed pedals and supporting arms, wherein said supporting arms are rotatably mounted on a shaft in a bearing housing;
    a first sprocket attached to said shaft;
    a second sprocket attached to said rear wheel; and
    an endless chain coupled between said first and second sprockets.

20. A three wheeled vehicle in accordance with claim 18 wherein said propulsion means includes a motor with transmission means to drive said rear wheel.

21. A three wheeled vehicle in accordance with claim 18 wherein said steering means includes a handlebar connected to a steering shaft attached to a steering arm and said mechanical control connection includes a swivel link coupled to said steering arm and said rear frame.

22. A three wheeled vehicle comprising:
    a right front steerable wheel and a left front steerable wheel disposed on respective sides of a central steering shaft having a handlebar attached thereto wherein each of said right and left front steerable wheels has a respective turning pivot;

a rear wheel positioned on a rear axle and disposed aft of and between said two front wheels;

a rider seat disposed intermediate said rear axle and said steering shaft, wherein said two front wheels including steering linkage disposed between their respective turning pivots and said central steering shaft;

a front frame coupled to and supporting said two front wheels, said steering shaft, and steering linkage and said handlebar;

a rear frame supporting a rider, said rear wheel, and a vehicle propulsion arrangement;

a pivotable connection between said front frame and said rear frame; and mechanical control means coupling said rear frame to said steering shaft for causing said rear frame to lean in the direction the vehicle is turning to counteract centrifugal force produced during a turn of the vehicle and for maintaining said front frame, said two front wheels and said steering shaft upright.

23. A three wheeled vehicle in accordance with claim 22 wherein said pivotable connection between said front frame and said rear frame has its axis passing substantially through an area where said rear wheel contacts a support surface upon which the vehicle is positioned.

24. A three wheeled vehicle in accordance with claim 22 wherein said mechanical control means between said rear frame and said steering shaft includes a swivel link connecting said rear frame to a steering arm attached to said steering shaft, with the degree of leaning of said rear frame having a controlled relationship with the degree of turning, in either direction, of said steering shaft, and wherein said vehicle further includes right and left stop means for limiting the amount of turning.

25. A three wheeled vehicle in accordance with claim 24 wherein said swivel link is provided with alternate attachment positions to change the relationship between the degree of leaning of said rear frame and the degree of turning of said steering shaft.

26. A three wheeled vehicle in accordance with claim 22 wherein said mechanical control means coupled to said rear frame and said steering shaft includes a swivel link connecting said rear frame to a control arm pivotally mounted on a common center with said steering shaft and having a yieldable connection, within controlled limits, between said control arm and a steering arm attached to said steering shaft.

27. A three wheeled vehicle comprising:
a right steerable wheel having a first turning pivot;
a left steerable wheel having a second turning pivot;
a steering shaft disposed generally intermediate said right and left wheels;
a center rear wheel having an axle disposed behind said right and left wheels;
a rider seat disposed in front of said rear wheel axle and behind said steering shaft;
steering linkage coupled to said right and left wheels between their respective turning pivots and said steering shaft;
a front frame coupled to and supporting said right and left wheels, said steering shaft, said steering linkage and a handlebar;
a rear frame coupled to and supporting a rider, said rear wheel, and vehicle propulsion means;
a pivotable connection coupled said front frame and said rear frame; and
mechanical control means coupling said rear frame and said steering shaft for causing said rear frame to lean in a direction the vehicle is turning to counteract centrifugal force produced during a vehicle turn, wherein the extent of leaning of the vehicle is a function of the magnitude of turning, in either direction, of said steering shaft and wherein said right and left steerable wheels, said steering shaft and said front frame are maintained upright.

28. A steering system in accordance with claim 27 wherein said pivotable connection between said front frame and said rear frame has its axis passing substantially through the area where said rear wheel contacts a support surface upon which the vehicle is positioned.

* * * * *